UNITED STATES PATENT OFFICE.

ORIEL M. GRAVES, OF ODESSA, WASHINGTON.

FLAKED CEREAL AND PROCESS OF PREPARING SAME.

1,060,449.　　　Specification of Letters Patent.　　Patented Apr. 29, 1913.

No Drawing.　　Application filed October 31, 1912.　Serial No. 728,882.

*To all whom it may concern:*

Be it known that I, ORIEL M. GRAVES, a citizen of the United States, residing at Odessa, in the county of Lincoln and State of Washington, have invented new and useful Improvements in Flaked Cereals and Processes of Preparing Same, of which the following is a specification.

My invention relates to an improved food product and process of preparing the same, the object of the invention being to provide a food product which is highly wholesome and nutritive, of an agreeable appearance and taste, and in condition to be easily digested without preliminary cooking before consumption.

In carrying my invention into practice I take selected whole wheat grains and cook the same slowly in sweetened water until thoroughly done. The grains are then partially dried in an oven or otherwise, and finally run in a suitably separated condition through hot fluted rolls, whereby the grains are dried and at the same time flattened out in flakes or wafers having a crimped or fluted appearance.

The sweetened water is prepared by adding to a determined amount of pure water a sufficient amount of sugar or suitable saccharine matter to sweeten the same without producing a syrup. This saccharine matter is taken up or absorbed by the grain and aids in the starch digestion in the cooking of the grains, and at the same time gives a desired sweetness and flavor to the product. By the process of first thoroughly cooking the grains, then partially but not completely drying the same, and finally driving off the remaining moisture through the medium of the hot rolls the particles of the grain are broken up or disintegrated sufficiently to insure the complete digestion or dextrinizing of the starch. A food product is thus provided which is wholesome, of fine taste, flavor and appearance and capable of being readily digested when eaten.

Having thus described the invention, what is claimed is:—

1. A food product consisting of cooked flattened whole wheat grain in the form of crimped flakes.

2. A food product consisting of flattened, crimped, sweetened, boiled and dry heated whole wheat grains.

3. The process of preparing the herein described food product, which consists in first slowly cooking whole wheat grains in sweetened water until thoroughly cooked, then partially drying the same, and then completely drying, flattening and crimping the grains by passing them through hot fluted rolls.

In testimony whereof I affix my signature in presence of two witnesses.

ORIEL M. GRAVES.

Witnesses:
W. M. NEVINS,
J. A. WALKER.